United States Patent

Singer

[15] 3,636,846
[45] Jan. 25, 1972

[54] SINGLE LENS REFLEX CAMERA WITH FOCAL PLANE SHUTTER UNIT

[72] Inventor: Franz Singer, Munich, Germany

[73] Assignee: Compur-Werk Gesellschaft mit beschrankten Haftung & Co., Munich, Germany

[22] Filed: June 26, 1970

[21] Appl. No.: 50,150

[30] Foreign Application Priority Data

July 1, 1969 Germany..................P 19 33 365.4

[52] U.S. Cl. ...................................................95/42, 95/57
[51] Int. Cl. ..............................................................G03b 19/12
[58] Field of Search ....................................................95/42, 57

[56] References Cited

UNITED STATES PATENTS 3,101,657  8/1963  Böhm et al................................95/42

Primary Examiner—Samuel S. Matthews
Assistant Examiner—Richard A. Wintercorn
Attorney—Charles Shepard and Stonebraker & Shepard

[57] ABSTRACT

A photographic camera of the single lens reflex-type with a focal plane shutter, in which the shutter is part of a preassembled unit which also includes the pivoted mirror and the interacting connections between the mirror and the shutter mechanism to insure operation of the swinging mirror in proper timed relation to the operation of the shutter slides or blades. This eliminates the assembling difficulties frequently encountered in prior cameras of the same general type, in which the mirror and its operating mechanism are customarily assembled on the camera body before the focal plane shutter unit is installed, the assembly of the proper connections between the shutter unit and the mirror and other parts mounted on the camera body being frequently quite troublesome.

5 Claims, 7 Drawing Figures

SINGLE LENS REFLEX CAMERA WITH FOCAL PLANE SHUTTER UNIT

BACKGROUND OF THE INVENTION

In the conventional prior art single lens reflex cameras which have focal plane shutters, the reflex mirror and the operating gearing or connections relating thereto are mounted in the camera housing. This requires a very exact coordination with regard to tolerance variations of the elements in the camera and in the focal plane shutter unit, in order to make sure that when the focal plane shutter unit is installed in the camera, the mirror and parts moving therewith will properly coact with the moving parts of the focal plane shutter unit. Such coordination is achieved only by time consuming and expensive adjustments during assembly. Moreover, it frequently happens that the operative position of the elements of the shutter unit can be mated to the position of the cooperating elements of the camera only with great difficulty. Often this is possible only at the expense of a more rational utilization of the available space. Also the assembly and disassembly is often complicated and difficult because of the many connected parts to which access must be made during the assembly or disassembly of the shutter unit.

An object of the present invention is the provision of a construction avoiding these disadvantages above mentioned, and providing a single lens reflex camera having maximum accuracy in the coordination of the elements of the camera and the elements of the shutter, as well as reducing manufacturing and assembly costs, and making minimum demands on space. To this end, the reflex mirror and its operating and control members are arranged, according to the present invention, on the housing of the shutter assembly unit. Thus the mirror and its operating and control parts can be easily assembled while in an accessible position on the shutter unit, and the necessary connections between the mirror parts and the shutter parts can be easily made and can be readily observed for accuracy of operation, after which the complete shutter unit with the mirror parts mounted thereon can be introduced as a unit into the body of the camera.

Another object of the invention is the provision of a camera in which there is a quick return pivoting mirror and in which there are shutter slides or blades, so designed that a shutter cocking or tensioning member mounted on the shutter housing is adapted to be coupled to the film feed mechanism of the camera and that both the driving springs of the shutter slides and the driving source for swinging the pivoted shutter are loaded or tensioned by movement of this cocking or tensioning member.

Still another object is the provision of a construction having the further advantageous feature that the cocking member is in the form of a pivotal lever which can be coupled to the film-feeding mechanism through a connecting member, and has an arm with which it is applied against an extension on one of the shutter slides which is used to load or tension the driving springs, and has a pin which moves an operating lever for loading or tensioning the power source which powers the movement of the mirror.

A further object is the provision of a construction in which the reflex mirror is held in the observation or focusing position by a latching lever, which lever is mounted on the housing of the shutter assembly unit and is adapted to be coupled in a very simple manner with the trip or release member on the camera body.

A still further object is the provision of a construction in which a latch lever for the cocked or tensioned shutter slides is mounted on the housing of the shutter assembly unit, and this lever is operated by a projection on the reflex mirror structure during the pivoting movement of the mirror from observation position to picture-taking position, and the operating lever is held in cocked position by a latching lever mounted on the housing of the assembly unit, this latching lever being moved aside by an extension on a shutter slide during the running down of the shutter slide into the closed position.

DESCRIPTION OF THE PREFERRED EMBODIMENT

Figure 2:
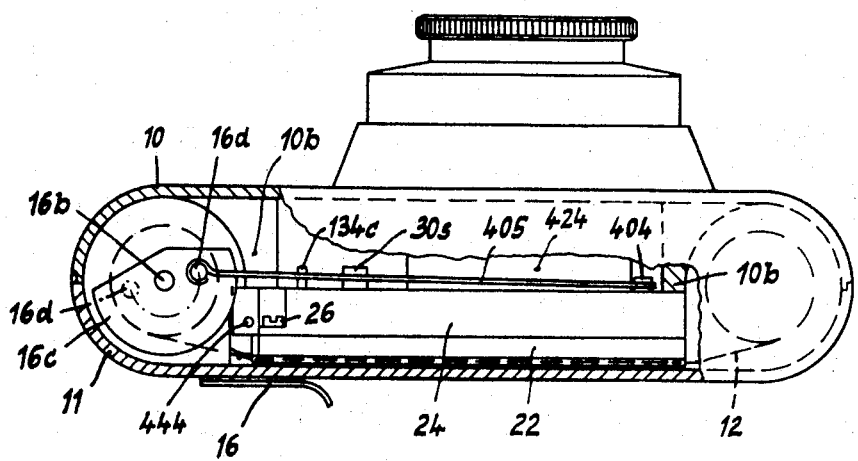
FIG. 2 is a bottom view of the camera, with parts broken away and parts in horizontal section approximately on the line II—II of FIG. 1.
Figure 1:
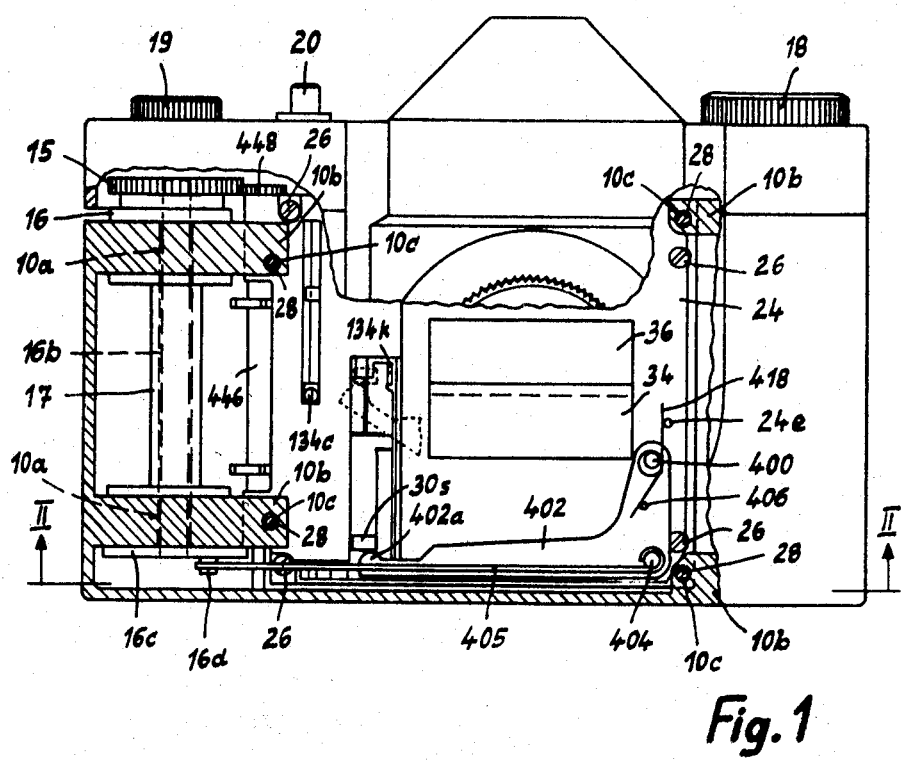
FIG. 1 is a front view of a camera in accordance with a preferred embodiment of the invention, with parts broken away and parts shown in vertical section.
Figure 4:
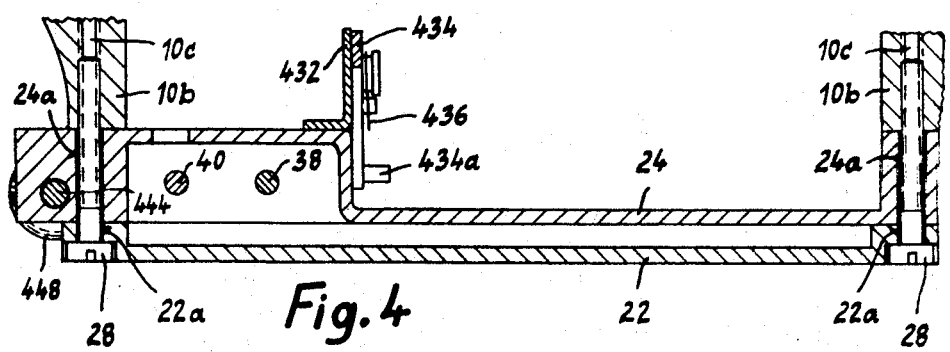
FIG. 4 is a section approximately on the line IV—IV of FIG. 3.

Referring first to FIGS. 1 and 2, there is shown a single lens mirror reflex camera having a main body or housing of two main parts, a forward section 10 and a rear section 11 which may be separated from each other for loading and unloading the film. Except for the various features described below, the camera may be of conventional form.

The film 12 in the camera is advanced from a supply spool at the right-hand end of the camera (when viewed as in FIGS. 1 and 2) by operating a film advancing or feeding lever schematically shown at 16, which lever is operatively connected to a mounting spindle 16b the axis of which is parallel to the exposure plane of the film. This spindle is guided in appropriate bearings 10a in the housing section 10. The mounting spindle 16b serves as a guide for a hollow winding reel 17 of known type, onto which the film is wound by operation of the lever 16. When exposure of the entire strip of film has been completed, the film may be wound back onto the original supply spool by operation of the rewinding knob 18.

A gear 15 is mounted for rotation on the upper end of the spindle 16b, and there is a pawl and ratchet coupling (not shown) of known type arranged between the elements 15 and 16 so that when the lever 16 is moved in a clockwise direction (when viewed as in FIG. 2) the gear 15 moves with it, similarly turning the takeup spool 17 and advancing the film through the space of one frame. When the lever 16 is liberated, it returns in the counterclockwise direction, under the action of the conventional return spring (not shown), leaving the gear 15 in the rotary position which it had reached.

Secured to the lower end of the spindle 16b is a cocking or tensioning plate 16c carrying a coupling pin 16d mounted eccentrically thereon. The portion 10 of the camera body or housing also has a extension pieces 10b with threaded holes 10c for attachment of the shutter assembly unit. In addition, arranged at the top wall of the camera housing is a shutter speed or time setting knob operatively connected to a conventional electronic or mechanical time control device (not shown) and a camera trip or release plunger 20.

The focal plane shutter unit or assembly, which is made as a self-contained unit for installation in the camera body, is of a construction best seen in FIGS. 3–7. The shutter unit has a housing made of two approximately rectangular parts, a rear part or section 22 and a forward part or section 24, connected to each other by a number of screws 26. Openings 22a and 24a are provided in the respective parts 22 and 24 for passage of attaching screws 28 which connect the shutter unit to the extension pieces 10b of the camera housing 10, these screws being threaded into the tapped openings 10c above mentioned.

Each half 22 and 24 of the shutter housing has an image window or exposure aperture 22b and 24b, respectively, the passage of light through these windows being controlled by flat slides or blades of the focal plane shutter movable in a vertical direction and parallel to the plane of the film strip, these slides being used to open and close the exposure aperture. There are four flat and approximately rectangular slides 30, 32, 34, and 36 made of thin sheet metal, such as sheet steel. Each is secured, as by screws, at one side (the left-hand side when viewed as in FIGS. 3 and 7) to a guide piece 130, 132, 134, and 136 respectively, of plastic or the like, these guide pieces sliding vertically on the guide rods 38 and 40 (FIGS. 4 and 7) which are parallel to each other. Slides or blades 30 and 32 constitute the opening group, and slides or blades 34 and 36 constitute the closing group of the focal plane shutter.

Associated with each of the slides is its own individual driving spring 230, 232, 234, and 236, respectively, the upper end of each spring being connected to the respective blade (or rather to its respective guide element 130, 132, etc.) while the lower end of each spring is anchored to the shutter housing, so that the springs tend to move the respective slides or blades downwardly. The functioning sequence of the focal plane shutter during cocking or tensioning and during the exposure movements after release, are performed in the manner fully described in applicant's U.S. Pat. No. 3,513,763, granted May 26, 1970, and in applicant's copending U.S. Pat. application Ser. No. 795,543, filed Jan. 31, 1969, and it is unnecessary to describe the action further herein.

A fixed pin 400 (FIGS. 1, 3, and 6) fastened to the shutter housing part 24 serves as a bearing for a pivoted lever 402 which has an arm 402a which engages a projection 30s on the opening slide assembly 30, 130. Moreover, a pin 404 is secured to the lever 402 is coupled to one end of a steel spring strip 405, the other end of which is coupled to the above-mentioned eccentric pin 16d on the plate 16c on the lower end of the spindle 16b.

An operating pin 406 fixed to the lever 402 engages in a slot 408a in an intermediate lever 408 which is mounted to oscillate on a pin 410 fixed in the housing. When the lever 402 swings clockwise on its pivot 400, the operating pin 406 on the lever 402 will move somewhat leftwardly from the position shown in FIG. 3, and this leftward arcuate movement of the pin 406, acting on the slot 408a, will swing the intermediate lever 408 counterclockwise on its pivot 410. This intermediate lever 408 also carries a pin 412, on which is pivoted the lower end of a bellcrank lever 414 which has, near its upper end, an arcuate slot 414a. A driving pin 416a on a cocking or tensioning lever 416 engages in this arcuate slot 414a. A return spring 418 (FIGS. 1 and 3) has one end engaged with a stationary pin 24e fixed to the shutter housing part 24 and the other end engaged with the operating pin 406 on the lever 402. The force of this return spring 418 strives to hold the parts 402, 408, and 416 in the respective rest positions illustrated in FIG. 3.

The cocking lever 416 has a boss or hub 416b which is rotatable freely on a spindle 420 which is mounted on the shutter housing part 24 and extends transversely and horizontally above the exposure aperture or image windows 22b, 24b. The hub 416b has a torsion spring 422 wound around it, one end of the spring pressing against the driving pin 416a and the other end pressing against the lever arm 424a of a mirror carrier 424. This lever arm loosely engages and is rotatable on the spindle 420. The mirror carrier also has another lever arm 424b which also loosely embraces the spindle 420. This arm 424b has a lateral projection 424bb. A reflex mirror 426 is suitably attached to the carrier 424, as by means of adhesive.

A storing spring 428 is wound around the spindle 420 in spiral fashion. Both ends of this spring bear against the stationary wall of the shutter housing part 24. The middle part of the spring presses against a projection 424v of the mirror carrier 424, tending to swing the mirror carrier downwardly to the observation position illustrated in FIGS. 3 and 5.

Cooperating with the above-mentioned projection 424bb of the mirror carrier 424 is an arm 338a of a catch or latch lever 338 mounted on a pivot on the shutter housing. The other arm 338b of this lever 338 is adapted to be brought into latching engagement with the projection 30s of the opening slide assembly 30, 130. Associated with the lever 338 is a setting spring 336 which biases the lever in a clockwise direction.

Figure 3:
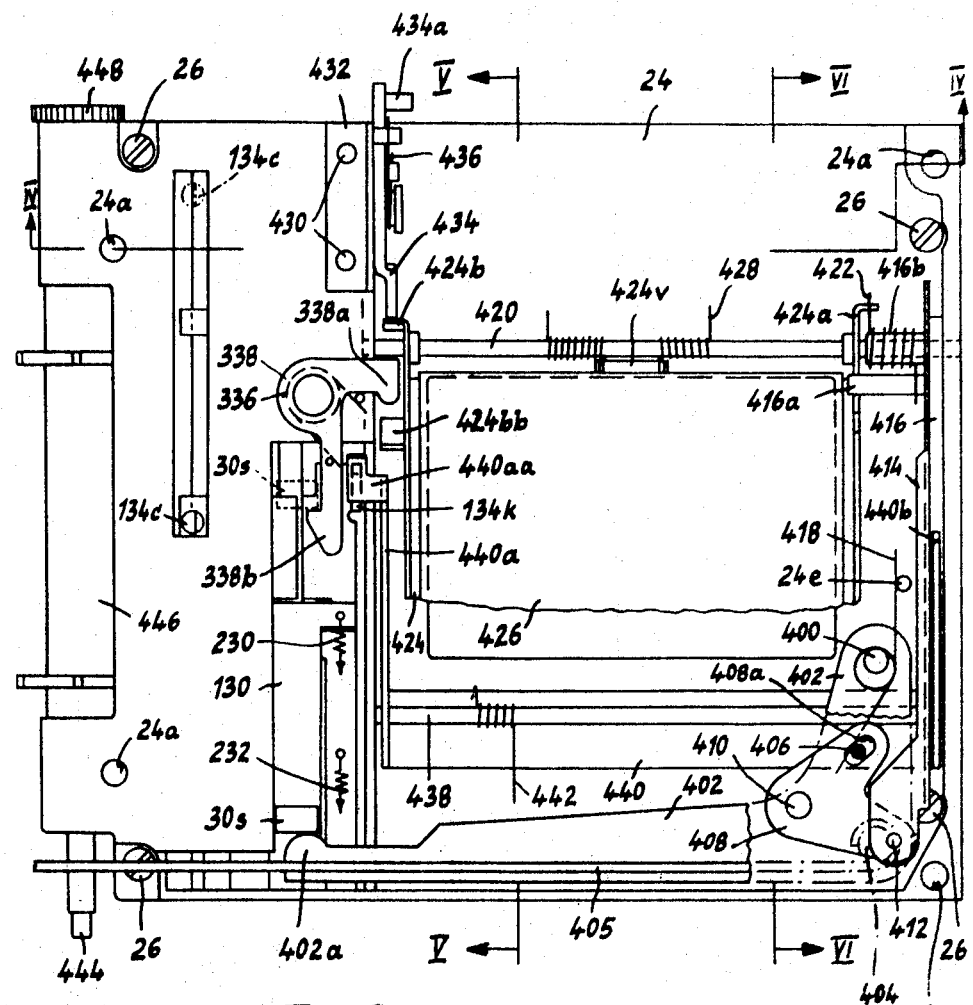
FIG. 3 is a front view, on an enlarged scale, of the assembly unit comprising the shutter housing and the mirror and associated parts mounted on the shutter housing, with parts broken away.
Figure 5:
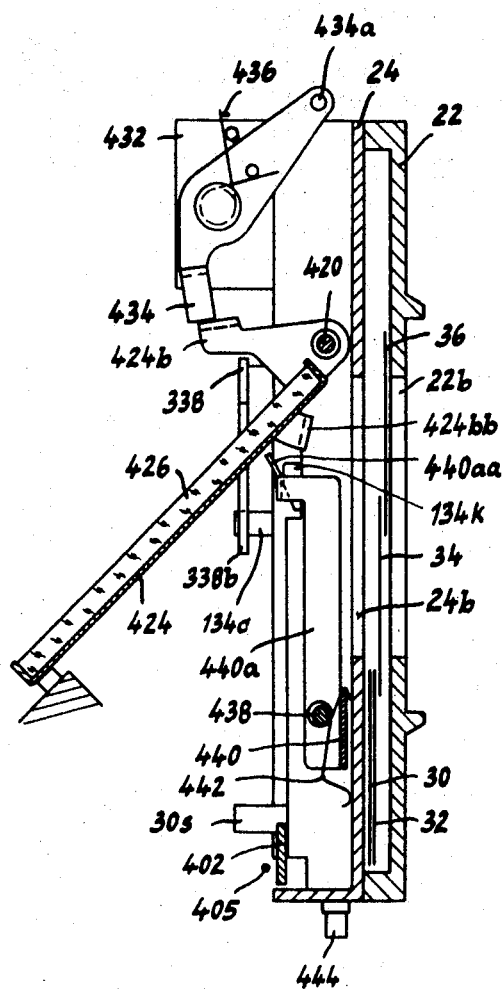
FIG. 5 is a section approximately on the line V—V of FIG. 3.
Figure 6:
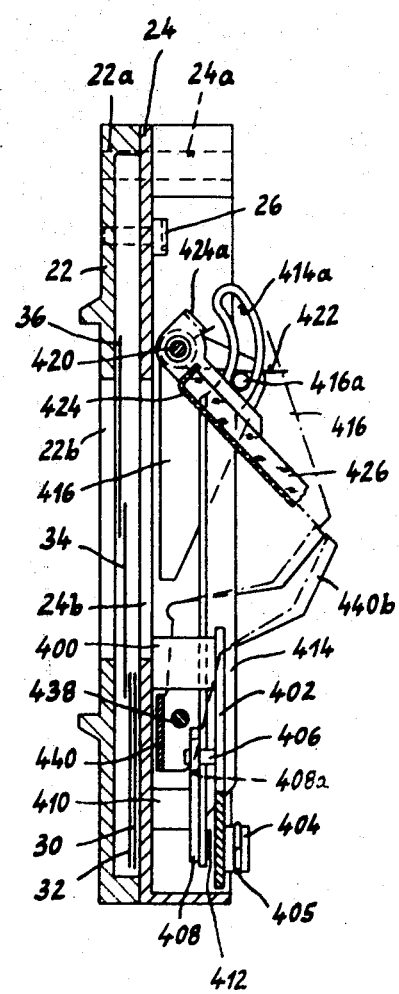
FIG. 6 is a section approximately on the line VI—VI of FIG. 3.
Figure 7:
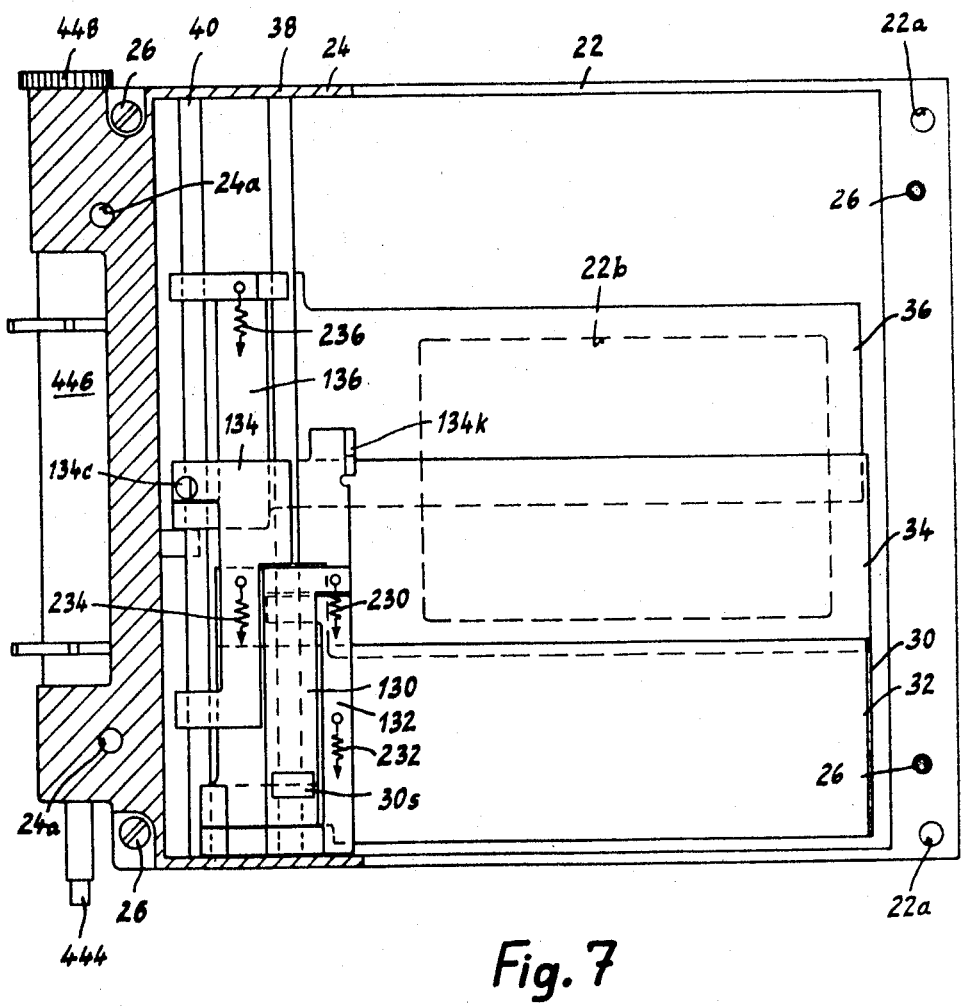
FIG. 7 is a view similar to part of FIG. 3, with many parts omitted, illustrating particularly the slides or blades of the focal plane shutter.

An angle piece 432 (FIGS. 3, 4, and 5) is fastened to the shutter housing wall 24 by rivets 430 (FIG. 3). This piece 432 carries the pivot of an intermediate lever 434 (best seen in FIG. 5) biased in a counterclockwise direction by the spring 436. In certain operating conditions, the lower end of the lever 434 is in latching engagement with the arm 424b of the mirror carrier 424, this being the position shown in FIGS. 3 and 5. A lateral pin 434a at the upper end of the lever is in a position to be engaged and depressed by downward movement of the camera trip or release plunger 20.

A further transverse spindle 438 is fastened to the wall 24 of the shutter housing and extends horizontally below the bottom edge of the exposure aperture or image window 22b, 24b. A U-shaped rocking piece 440 is mounted to swing on this spindle 438. The left-hand limb 440a of this rocking piece has a cranked portion 440aa which is trapped by a wedge-shaped projection 134k of the closing slide assembly 34, 134 when the shutter is at rest or in the rundown position. The right-hand limb 440b of the rocking piece serves to hold the latching lever 416. Wound around the spindle 438 is a set spring 442, one end of which bears against the shutter housing 24 and the other end of which engages the rocker 440 and urges the limbs 440a and 440b of the rocker in an upward and rearward direction; that is, clockwise when viewed as in FIG. 5, or counterclockwise when viewed as in FIG. 6.

A vertically extending bearing spindle 444 (FIGS. 1, 3, and 7) is rotatably mounted on the shutter housing portion 24, and carries a film feed roller 446. A pinion 448 at the upper end of the spindle is adapted to engage the gear 15 in the camera body housing when the shutter unit is assembled into the camera.

The self contained structural groups or units described above, namely, the camera unit and the shutter assembly unit, are so organized that they can be united with a minimum of handling. On the shutter assembly unit, the shutter slides or blades are between the housing walls 22 and 24 and are, of course, assembled before these two housing parts are connected to each other. But practically all of the other moving parts are mounted externally on the forward side of the front wall 24 of the shutter housing, and so are readily accessible for easy assembly and easy testing and adjustment, before the shutter assembly unit is placed in the camera body. The shutter assembly unit is introduced into the camera body from the rear, the rear section 11 being removed from the front section 10 of the camera body at this time, of course. The shutter unit is fastened into the camera body by inserting the screws 28 through the shutter unit and threading them into the openings 10c to draw the shutter unit tightly against the bearing pads 10b in the shutter body, which pads serve as abutments or locating surfaces for the shutter assembly unit. The movement of introducing the shutter assembly unit into the camera body brings the gear 448 on the shutter unit into meshing engagement with the gear 15 in the camera body, and brings the pin 434a of the lever 434 into position in the path of travel of the camera trip or release member 20 which is in the camera body. All that remains to be done is to loop the left end of the coupling element 405 around the pin 16d on the tensioning plate 16c, as seen in FIGS. 1 and 2, and this completes the operative connection of the shutter unit to the moving parts of the camera body. It will be realized by those skilled in this art that this manner of assembling the parts is much simpler and less time-consuming than in the conventional construction where the pivoted mirror and its operating parts are built into the camera body independently of the shutter unit, and where various connections and adjustments must be made under great difficulties, due to space limitations and relative inaccessibility of the parts.

After the shutter assembly unit has been installed in the camera, the operation is as follows: When the feed lever 16 is operated, the filmstrip 12 is advanced through one picture frame, and the mounting spindle 16b and tensioning disk 16c turn with the lever 16, in a clockwise direction when viewed as in FIG. 2. This moves the coupling pin 16d from the rest position illustrated in full lines to the cocked position shown in dotted lines. The pin 16d thereby draws the coupling element 405 leftwardly with it and, through the pin 404, moves the lever 402 clockwise on its pivot 400. This raises the end 402a of the lever 402 which moves up from the full line position of FIG. 1 to the dotted line position thereof, thereby raising the lug 30s of the shutter slide assembly 30, 130, from its bottom or rundown position to its upper position in which the shutter is cocked or tensioned. The lug 30s is held in the upper position (shown in dotted lines in FIG. 3) by the latching lever 338b. During this upward movement of the lug 30s of the opening blade or slide system of the shutter, the projection 134c of the closing slide system is carried along with it through the same upward distance. A retaining lever (not shown) is then imposed in front of the lug 134c to prevent the closing blade system from running down until an interval after the running down of the opening blade system. This delay in the running down movement of the closing slide system is not part of the present invention so is not illustrated or further explained here, but is well understood in the focal plane shutter art and one form of mechanism for accomplishing this is disclosed in applicant's above-mentioned U.S. Pat. No. 3,513,763.

The clockwise movement of the lever 402 which occurs at the time of cocking or tensioning the shutter also produces, through the pin and slot coupling 406, 408a, a pivoting movement in a counterclockwise direction of the intermediate lever 408. This raises the bellcrank lever 414 approximately vertically upward, through the joint 412. The slot 414a in the bellcrank lever produces a similar upward entrainment of the pin 416a on the lever 416, swinging this lever from the full line position to the dotted line position shown in FIG. 6. It is held in this position by the limb 440b of the rocker 440. During the tensioning procedure, the projection 134k has moved upwardly, which frees the arm 440aa so that the rocker 440 can swing rearwardly under the influence of its spring 442 (clockwise in FIG. 5 or counterclockwise in FIG. 6) and the latching arm 440b of this rocker can swing from the full line position to the dotted line position of FIG. 6, thereby latching the lever 416 in its dotted line position. The pivotal movement of the lever 416 in the counterclockwise direction also serves to load or tension the spring 422 which will subsequently serve to bring about the pivotal movement of the mirror 426 from its observation or focusing position to its picture-taking position.

After the film has been advanced and the shutter has been cocked, the parts 16, 16c, 405, 402, 408, and 414 return to their starting positions as in FIG. 3, under the action of the return spring 418. The bellcrank lever 414 can perform this return movement without hindrance because the slot 414a therein allows the pin 416a to remain in its upper position while the lever 414 returns downwardly.

When a photograph is to be taken, the usual camera settings are made in the conventional way, to set the diaphragm aperture, the exposure period or shutter speed, and the focus distance. The camera trip or release member 20 is then operated by downward pressure on this plunger. This presses against the pin 434a, causing the intermediate lever 434 to swing in a clockwise direction (FIG. 5) which moves the lower end of this lever away from the lever arm 424b. At this time, the previously loaded or tensioned spring 422 is more powerful than the return spring 428. Therefore, as soon as the lever 434 releases the arm 424b of the mirror carrier, the spring 422 acts on the arm 424a of the mirror carrier to swing the mirror carrier and the mirror 426 upwardly (clockwise in FIG. 5, counterclockwise in FIG. 6) from the observation position or focusing position, to the picture taking or out-of-the-way position.

At the end of the upward swinging movement of the mirror carrier 424, the lateral projection 424bb thereof engages the arm 338a of the latching lever 338 and swings this latching lever counterclockwise (FIG. 3) to unlatch the projection 30s on the shutter blade or slide opening system. The opening system 30, 130, 32, 132 therefore runs down to its rest position, under the action of its individual driving springs 230 and 232, so that the image window or exposure aperture is opened, and light coming in through the camera lens can reach the portion of the filmstrip 12 which is behind the exposure aperture. At a variable time with respect to the running down movement of the opening slides, the above-mentioned projection 134c of the closing slide system is released, by mechanism such as disclosed in applicant's above-mentioned U.S. Pat. No. 3,513,763 or applicant's copending application Ser. No. 795,543 or any other suitable shutter speed or exposure time control mechanism known in the art. This enables the closing slide or blade system 34, 134, 36, 136 also to run down to the rest position under the influence of the individual driving springs 234 and 236, thereby reclosing the image window or exposure aperture and terminating the exposure. At the end of this running down movement, the wedge-shaped projection 134k on the closure slide assembly 34, 134 engages the arm 440aa, thereby rocking the rocker 440 slightly forwardly on its shaft 438 against the action of its spring 442. This moves the latching arm 440b of the rocker forwardly out of latching engagement with the lever 416, so this lever can now return from the dotted line position of FIG. 6 to the full line position thereof. This return movement of the lever 416 relaxes the spring 422, so that this spring, previously tensioned so as to be stronger than the spring 428, is now weaker than the spring 428. Consequently the spring 428 now returns the mirror carrier 424 and the mirror 426 downwardly from the out-of-the-way position or exposure position to the observation or focusing position, and it becomes latched in this position (FIG. 5) by the return of the latching lever 434 to its latching position under the influence of its spring 436.

This restoration of the mirror 426 to the focusing position, by the weaker spring 428, is only possible because the two abutments for the more powerful spring 422 (namely, the pin 416a and the arm 424a) move in the same direction of rotation, concomitantly with this pattern of movement. Consequently, the powerful spring 422 is not loaded at this time and cannot become more powerful than the return spring 428. The unobstructed running down movement of the lever 416 is permitted by the slot 414a of the bellcrank lever 414, which slot is appropriately dimensioned for this purpose.

The foregoing description clearly shows that the reflex mirror and its operating control members are carried by the independent assembly unit of the focal plane shutter. Thus when the shutter unit is installed in the camera, only a few connections (16d, 434a, and 448) are required between the shutter unit and the camera unit, and moreover no great accuracy of coupling or engagement is required in any of these connections. No close tolerances are demanded in any of these connections. Consequently, the normal manufacturing tolerances as regards dimensions and relative positioning of these elements which are to be coupled, can be accepted without any problems, when the shutter unit is installed in the camera unit. This enables any adjustment between the coupling elements of the camera unit and the shutter unit during assembly to be dispensed with. The parts of the operating mechanism which call for a high degree of accuracy of engagement, because of their interaction in use, are all located within one and the same unit, namely, the shutter assembly unit, so that they can be placed in the most favorable spatial position during the designing of this unit, and can be kept within rigid tolerances during production.

What is claimed is:

1. A single lens mirror reflex camera with a focal plane shutter, comprising a camera housing, film feeding mechanism, and a self-contained shutter assembly unit adapted to be inserted into and secured in the camera housing, said camera including a quick return pivoted reflex mirror movable from an observation position to a picture taking position, a movable shutter having a plurality of movable slides, a shutter housing containing said movable shutter, and operating and control members for operating and controlling movements of said mirror and said shutter in predetermined sequence relative to each other, said mirror and said operating and control members being mounted on said shutter housing and constituting part of said self-contained shutter assembly unit and being arranged to be bodily inserted into said camera housing as part of said unit, characterized by the fact that said operating and control members include a cocking member (402) mounted on said shutter housing (24) and coupled to the film feeding mechanism (16, 16c) of the camera, and by the fact that driving springs (230, 232, 234, 236) for the shutter slides (30, 32, 34, 36) and also a power source (422) for swinging said pivoted mirror (426) from observation position to picture taking position are loaded by cocking movement of said cocking member (402).

2. A camera as defined in claim 1, further characterized by the fact that said cocking member (402) is in the form of a pivoted lever and is coupled to said film-feeding mechanism (16, 16c) by a connecting member (405), and by the fact that said cocking member has an arm (402a) which engages an extension (30s) on one of said shutter slides (30, 130) to move said slides to load said driving springs (230, 232, 234, 236), and by the fact that said cocking member has a pin (406) which causes movement of mechanism (408, 414, 416) for loading said power source (422) of said mirror.

3. A camera as defined in claim 1, wherein said reflex mirror is held in observation position by a latching lever (434), characterized by the fact that said latching lever is mounted on said shutter housing (24) of said shutter assembly unit and is adapted to be coupled with a trip member (20) on said camera housing.

4. A camera as defined in claim 3, wherein there is a latching lever (338) for holding the shutter slides (30, 32, 34, 36) in cocked position, characterized by the fact that said latching lever (338) is mounted on said shutter housing (24) of said assembly unit and is operated and moved to unlatching position by a projection (424bb) connected with said reflex mirror (426) during movement of said reflex mirror from observation position to picture taking position.

5. A camera as defined in claim 2, characterized by the fact that said mechanism for loading said power source includes an operating lever (416) which is held in cocked position by a latching lever (440b) which is mounted on said shutter housing (24) of said shutter assembly unit, and that said latching lever is moved to an unlatching position by an extension (134k) on a shutter slide (34, 134) during running down of said shutter slide to closing position.

* * * * *